United States Patent
Stoll et al.

(10) Patent No.: US 6,550,145 B2
(45) Date of Patent: Apr. 22, 2003

(54) PORTABLE HANDHELD WORK APPARATUS

(75) Inventors: Gerhard Stoll, Winnenden (DE); Andreas Schneider, Weinstadt (DE); Jürgen Steinmaier, Notzingen (DE)

(73) Assignee: Andreas Stihl AG & Co., Waiblingen (DE)

( * ) Notice: Subject to any disclaimer, the term of this patent is extended or adjusted under 35 U.S.C. 154(b) by 0 days.

(21) Appl. No.: 09/903,662

(22) Filed: Jul. 13, 2001

(65) Prior Publication Data

US 2002/0004988 A1 Jan. 17, 2002

(30) Foreign Application Priority Data

Jul. 15, 2000 (DE) .......................... 100 34 437

(51) Int. Cl.⁷ .............. F16C 1/06; B25D 17/24; A01D 34/412
(52) U.S. Cl. ............ 30/276; 173/162.1; 464/52
(58) Field of Search ............ 30/276, 296; 56/12.7; 173/162.1; 464/52

(56) References Cited

U.S. PATENT DOCUMENTS

| 4,491,184 A | * | 1/1985 | Kawaharazuka | 173/162.1 |
| 4,586,322 A | * | 5/1986 | Yokocho et al. | 56/12.7 |
| 4,714,447 A | * | 12/1987 | Hironaka | 464/52 |
| 4,817,738 A | * | 4/1989 | Dorner et al. | 173/162.1 |
| 5,774,993 A | * | 7/1998 | Schlessmann | 30/276 |

* cited by examiner

Primary Examiner—Hwei-Siu Payer
(74) Attorney, Agent, or Firm—Walter Ottesen

(57) ABSTRACT

The invention is directed to a portable handheld work apparatus such as a brushcutter, edge cutter or the like. The work apparatus has a drive motor which drives a rotatable work tool via a drive shaft (3) journalled in a guide tube (2). The guide tube (2) is held in a housing (5) of the drive motor by an anti-vibration unit (6). The anti-vibration unit (6) includes a clamp (7) which surrounds the guide tube (2) and elastic damping elements (8, 9) which lie between the clamp (7) and the housing (5). The clamp (7) surrounds the guide tube (2) and is fixed form tight on the housing (5).

22 Claims, 5 Drawing Sheets

PORTABLE HANDHELD WORK APPARATUS

BACKGROUND OF THE INVENTION

In work apparatus such as brushcutters, edge cutters or the like, a relatively long guide tube is provided between the drive motor and its housing, on the one hand, and the driven rotatable work tool on the other hand. The guide tube accommodates the drive shaft. With this arrangement, a relatively soft connection is presented between the motor and the work tool. During operation, vibration problems can result in connection with the interaction between the drive motor and the driven work tool.

The guide tube is connected to the motor housing via an anti-vibration element in order to avoid such vibration problems. The occurring vibration problems must be effectively damped by such an anti-vibration element. At the same time, a reliable connection of the guide tube to the motor housing must be provided thereby.

Configurations are known wherein a clamp is fixed with clamping lugs on the motor end of the guide tube. The clamp has clamping lugs, for example, made of plastic or die cast metal. A tubular-shaped damping element made of elastic material is pushed over the clamp. For assembly, the unit comprising the guide tube with the clamp and the damping element is pressed into a corresponding receptacle of the motor housing. The clamping lugs project at the end face beyond the motor housing which requires a correspondingly large amount of space for accommodating the same. The press-in operation requires complex devices and alignment errors in the assembly state cannot be precluded. An exchange of the guide tube, for example, at a service station is difficult without corresponding devices. A guide tube seated with precision during manufacture can become displaced or rotate relative to the motor housing under high or continuous loads. The clamping action between the clamp and the guide tube can deteriorate when the material yields, for example, in the case where the clamp is made of plastic. For an embodiment wherein the clamp is made of die cast aluminum, the clamp is very stiff so that it can adapt to the guide tube only to a limited extent.

SUMMARY OF THE INVENTION

It is an object of the invention to provide a vibration-dampening connection of a guide tube to the housing of a work apparatus as well as to improve the exchangeability of a guide tube.

The portable handheld work apparatus of the invention includes a brushcutter and an edge cutter. The portable handheld work apparatus includes: a housing; a guide tube having first and second ends; a drive shaft rotatably journalled in the guide tube; a rotatable work tool mounted at the second end of the guide tube; a drive motor mounted in the housing for rotatably driving the work tool via the drive shaft; an anti-vibration unit for holding the guide tube in the housing at the first end of the guide tube; the anti-vibration unit including a clamp surrounding the guide tube; an elastic damping element disposed between the housing and the clamp; and, the clamp and the housing being configured for fixing the clamp form tight in the housing.

For the above, the clamp, which surrounds the guide tube, is fixed form-tight to the housing of the motor. This affords the possibility to omit pressing the damping element into the motor housing under high pretension. With the form-tight connection, the assembly comprising the guide tube and the anti-vibration unit is reliably fixed on the housing and is secured against rotation or displacement. A rotation or displacement of the guide tube relative to the clamp is permanently avoided by the excellent clamping action between the two. A simple exchange without special tools is possible because of the configuration of the form-tight connection. The form-tight fixation of the clamp on the motor housing is practical in the region where the clamp for the guide tube is secured with threaded fasteners.

It is advantageous when the clamp is configured as an approximately cylindrical clamping sleeve having one or several longitudinal slots and two or more clamping lugs which can be clamped against each other and which extend radially outwardly and are arranged laterally of the longitudinal slot. The housing has an end face at the end thereof facing toward the guide tube and further has a cutout in the end portion in which the clamping lugs of the clamp are accommodated. At the same time, a reliable clamping of the clamp on the guide tube is provided with the clamping lugs with simple means. The clamping lugs project radially and lie in the cutout of the housing and simultaneously also form a form-tight configuration to prevent rotation. The rotation is here prevented without additional devices. The cutout at the end of the housing is advantageously open in the direction of the end face so that the clamping lug can be inserted into the receptacle from the end face for assembly without disassembly of the housing.

In a practical embodiment, the clamping lugs each include a bore for passing through a clamping bolt for which at least one and preferably two openings are provided in the housing for accommodating the ends of the clamping bolt. These openings are aligned approximately coaxial to the clamping bolt. In this way, after assembly of the clamp, the clamping bolt can be guided through one of the two openings in the housing as well as through the corresponding bores in the clamping lugs and then be clamped, that is, threadably tightened. The two ends of the clamping bolt, which lie in the openings of the housing, are then held in a form-tight manner and additionally form also a form-tight connection to ensure against an axial displacement which is in addition to the above-described form-tight security against rotation.

A part of the elastic damping element is advantageously configured in the form of damping bushings surrounding the ends of the clamping bolt. In this way, an effective damping of vibrations in the peripheral and longitudinal directions with respect to the guide tube is given with simple means directly at the form-tight connection of the clamp to the motor housing. The damping bushings advantageously include a peripheral collar with which they are form-tightly fixed in the housing. In this way, they are easy to assemble and protected against dropping out when loosening the clamping bolt. It is practical to arrange the damping bushings so that the clamping lugs of the clamp lie tightly against the end face of the damping bushing and especially against the end face of the collar of the bushing. With this arrangement, no force-transmitting intermediate elements are needed. In addition to an excellent damping action, a relatively rigid connection of the guide tube to the housing is provided.

In a simple and practical configuration, the clamping bolt is configured as a threaded bolt having a head and a nut. A first metal sleeve for accommodating the head is provided in one bushing and a second metal sleeve for accommodating the nut is provided in the other bushing. The metal sleeves are especially made of steel. The steel sleeves can be manufactured in a simple and cost-effective manner and prevent an excessive areal pressing between the clamping bolt and the damping bushings.

In an advantageous embodiment, the sleeves include two flats lying approximately parallel to each other between which the nut is held against rotation. As a consequence thereof, the clamping bolt, which is configured as a threaded bolt, need only be rotated at its head with a suitable tool without it being necessary to hold the nut with a further tool. An arrangement of this kind simplifies the automatization of manufacture as well as the exchange of a damaged guide tube or the anti-vibration unit as may be required.

In a further practical embodiment, the sleeve and the nut can be configured also as one piece whereby the number of parts to be assembled is reduced. The sleeves have a holding slot on the end face thereof into which a screwdriver can be seated as needed. For example, in the case of a thread which has become fixed because of rust, the screw connection of the clamping bolt can be loosened without this being made more difficult by a rotation of the sleeve. It is practical to provide an ensurance against rotation on the sleeve and this can be especially in the form of a hexagon formed thereon. Such an ensurance against rotation is held in the elastic damping sleeve or in a hexagonally-shaped cutout of the clamp whereby the occurring torque is taken up during the assembly of the bolt.

In an advantageous variation, a set nut is pressed into the sleeve. In this way, a fix against rotation is provided by the form-tight connection of a serrated, milled or knurled collar of the set nut.

The clamping sleeve is advantageously surrounded by a damping sleeve as a further part of the anti-vibration unit and of the corresponding damping element. The damping sleeve lies in the corresponding receptacle of the housing for the guide tube. In this way, in addition to the rotation and longitudinal vibration damping, an effective damping against bending vibrations is provided. It is practical when the damping sleeve has a cutout which surrounds the clamping lugs of the clamp. The clamping action between the clamp and the guide tube occurs in the region of the clamping lugs. For this reason, there is here a transfer of force from the guide tube via the clamp in the region of the clamping lugs and via the damping sleeve directly into the motor housing in this region. With an arrangement of this kind, an excellent damping action as well as a relatively rigid and therefore precise connection of the guide tube to the housing can be achieved. For simplifying assembly, the damping sleeve has a lug which projects radially outwardly and this lug projects into the cutout of the housing for accommodating the clamping lugs whereby a rotation of the damping sleeve is prevented.

In an advantageous embodiment, the clamping sleeve is extended in the direction of the motor beyond the region of the clamping lugs. In this region, the clamping action is low but with the extended configuration, a secure guidance of the guide tube during assembly and also during operation is provided. The longitudinal slot extends between the two clamping lugs advantageously over the entire length of the clamping sleeve whereby the assembly is considerably simplified. In this way, the possibility is especially provided to first seat the damping sleeve and thereafter the clamping sleeve in the motor housing in that the clamping sleeve is pressed together at the two clamping lugs and is pushed into position. Thereafter, for example, with a screwdriver or even in an automated operation, the longitudinal slot can be expanded against the spring force of the damping sleeve so that the guide tube can be pushed into the clamping sleeve without developing force.

The clamp is advantageously manufactured as a single piece and is especially made of sheet metal. In addition to a cost-effective manufacture, a reliable clamping of the guide tube is also given thereby because, on the one hand, the sheet metal can adapt to a certain extent to the guide tube and, on the other hand, the developed clamping force can be maintained permanently because of the absence of creep behavior in the material. The clamping lugs are advantageously provided with reinforcing creases whereby, on the one hand, the sheet metal of the clamping lugs can be configured so thin that a desired adaptation to the guide tube can be achieved. On the other hand, the clamping lugs are sufficiently reinforced by the reinforcement creases so that the lugs do not yield because of the development of a clamping force by the clamping bolt.

The damping elements and especially the damping bushings as well as the damping sleeve preferably have a set of slots on the interior side and on the exterior side. Because of these longitudinal slots, the deformability of the elastic damping material is ensured also in the assembled state because the elastic material can deviate under load in the direction of the slots. To support this effect, the set of longitudinal slots on the interior side and the set of longitudinal slots on the exterior side are offset relative to each other in the peripheral direction.

The elastic damping elements are preferably of adapted stiffness. The particular stiffness of the damping sleeve and of the damping bushings can be adapted independently of each other whereby the possibility is provided to optimally dampen the various longitudinal, rotational and bending modes of vibration. Here, the selection of adapted Shore hardness has been shown to be especially practical.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
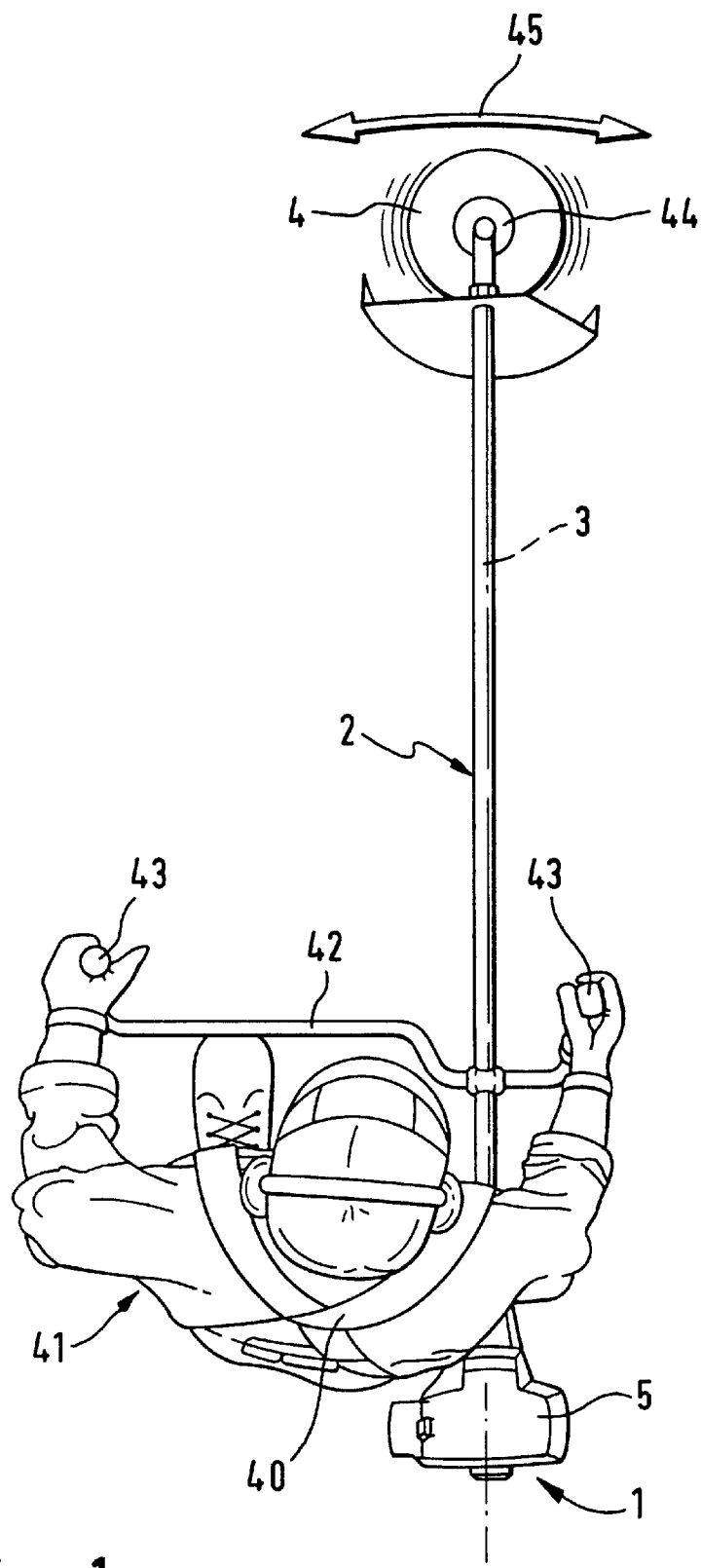
FIG. 1 is an overview diagram showing an operator utilizing a portable handheld work apparatus in accordance with the invention which is shown here in the form of a brushcutter.

FIG. 1 shows an operator 41 holding a brushcutter utilizing a carrier belt 40. The operator is shown guiding the brushcutter via two handles 43 at respective ends of a handlebar 42. The handlebar 42 is attached to a guide tube 2 in which the drive shaft 3 is journalled. A housing 5 for a drive motor 1 (not shown in greater detail) is mounted on the guide tube 2 in the region of the operator 41. The drive motor 1 drives a rotatable work tool 4 via the drive shaft 3 and via a gearcase 44. The work tool 4 is guided approximately in the direction shown by the double arrow 45 by the operator 41 utilizing the handles 43 and the handlebar 42.

Figure 2:
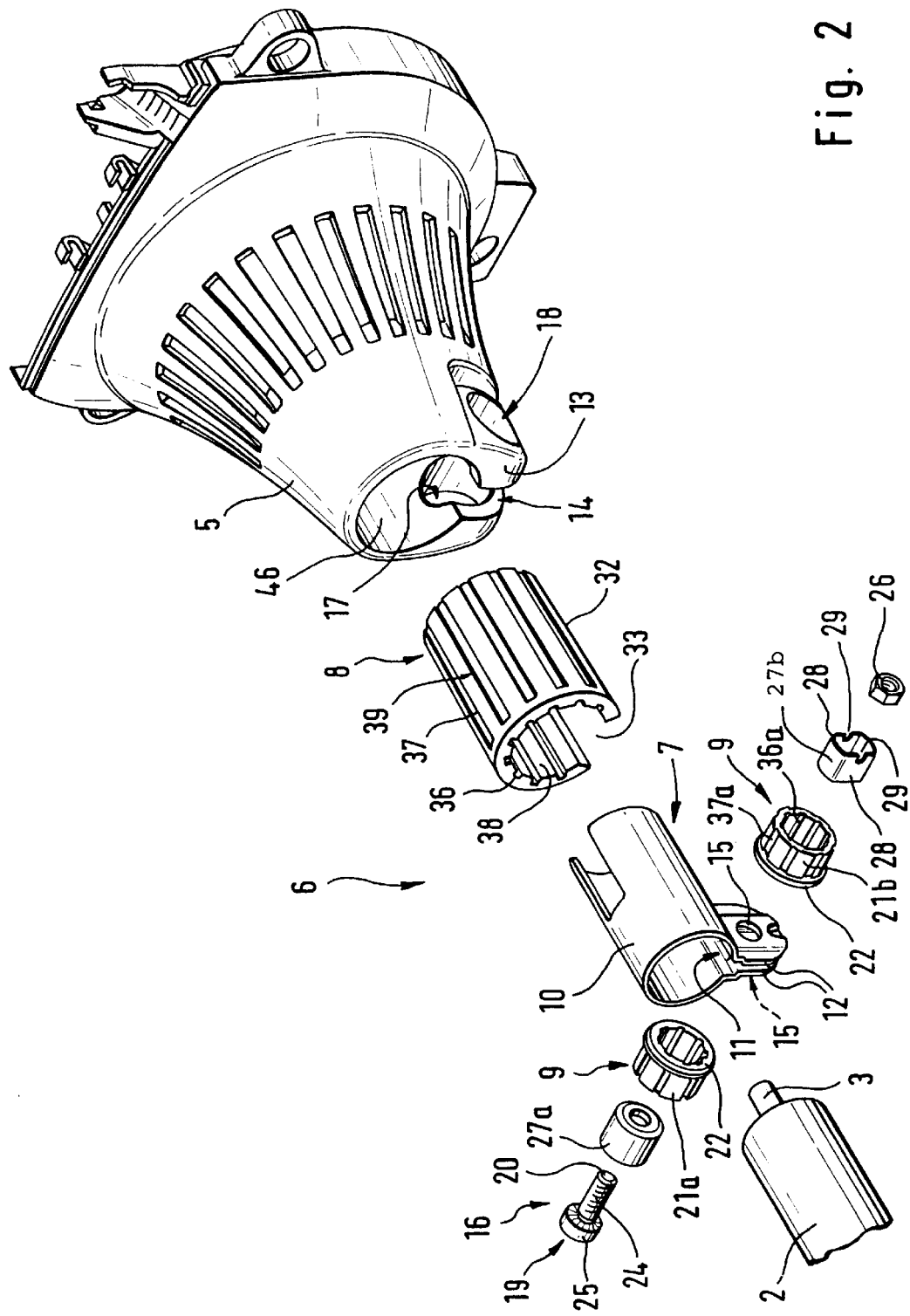
FIG. 2 is an exploded view showing the individual parts of the brushcutter of FIG. 1 in the region of the connection of the guide tube to the motor housing.

The exploded view of FIG. 2 shows the essential individual parts of the brushcutter of FIG. 1 in the region of the connecting location between the guide tube 2 and the housing 5. The motor end of the guide tube 2 with the drive shaft 3 rotatably journalled therein is fixed by means of an anti-vibration unit 6 in a receptacle 46 of the housing 5. The anti-vibration unit 6 includes a clamp 7 for the guide tube 2. The clamp 7 comprises a clamping sleeve 10 which surrounds the guide tube 2 and has a longitudinal slot 11 extending over the entire length. At both sides of the longitudinal slot 11, two clamping lugs 12 are provided having respective bores 15. The clamp 7 can be clamped via a clamping bolt 16.

The clamping bolt 16 can be a bolt having a snap closure, an elbow lever or the like and, in the embodiment shown, it is a threaded bolt 24 having a head 25 and a nut 26. The clamping bolt 16 is passed through respective sleeves 27 arranged on both sides of the clamping lugs 12. Damping elements 9 in the form of damping sleeves 21 are interposed between each sleeve 27 and each clamping lug 12. The sleeve 27 on the side of the nut 26 has two flats 28 between which the nut is held form tight so that it cannot rotate. On its end face, the sleeve 27 has two holding slots 29 for a screwdriver or the like. Each of the two damping bushings 21 has a collar 22 on the end thereof facing toward the clamping lugs 12 for contact engaging the clamping lugs 12 and for a form-tight fixation in the housing 5.

A further elastic damping element 8 is arranged between the clamping sleeve 10 and the surface of the receptacle 46 in the housing 5. This additional elastic damping element is in the form of an elastic damping sleeve 32 having an approximately cylindrical shape and whose length corresponds approximately to the length of the clamping sleeve 10. The damping sleeve 32 includes a cutout 33 for the two clamping lugs 12. Longitudinal slots (36, 37) are provided on the inner side 38 and on the outer side 39, respectively. The longitudinal slots 36 on the inner side 38 are offset with respect to the longitudinal slots 37 in the outer side 39. In a comparable manner, the two damping bushings 21 likewise have longitudinal slots (36a, 37a) on their inner and outer sides, respectively. The damping bushings 21 and the damping sleeve 32 can be made of an elastic synthetic material and are of rubber having an adapted Shore hardness in the embodiment shown.

The housing 5 has a receptacle 46 at its end face 13 for accommodating the anti-vibration unit 6 together with the guide tube 2. At the end 13, there is also a cutout 14 provided for the clamping lugs 12 as well as two openings (17, 18) for the two ends (19, 20) of the clamping bolt 16.

Figure 3:
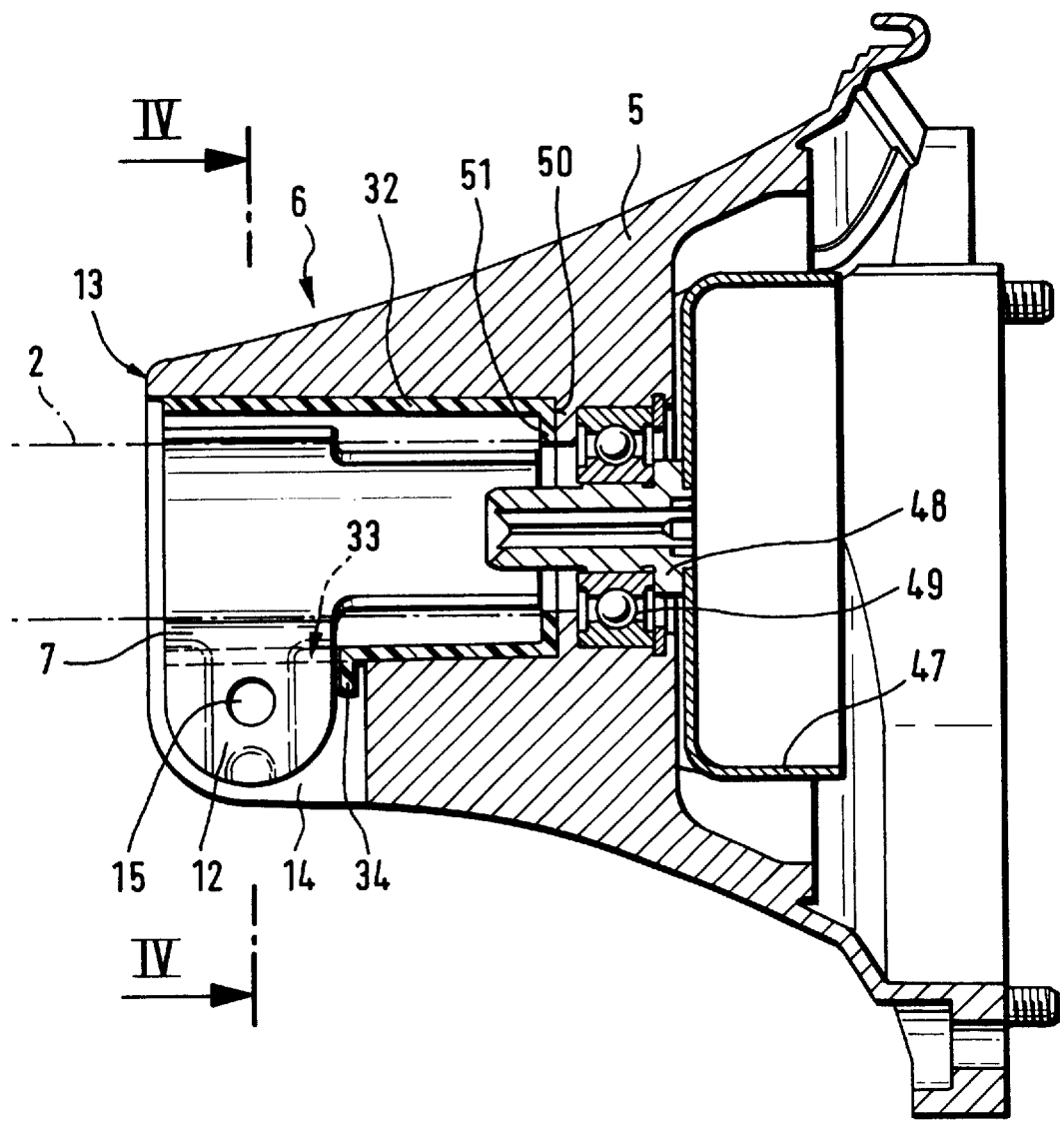
FIG. 3 is a longitudinal section view showing the arrangement according to FIG. 2 in the assembled state.

FIG. 3 shows, in longitudinal section, the arrangement of FIG. 2 in which the anti-vibration unit 6 together with the guide tube 2 are held in the housing 5. The guide tube 2 is shown in phantom outline. A clutch drum 47 of a centrifugal clutch (not shown) having a drive sleeve 48 is shown for driving the drive shaft 3. The drive sleeve 48 is rotatably journalled in a ball bearing 49. A longitudinal stop 50 for the damping sleeve 32 and the clamp 7 is provided in the region of the ball bearing 49. In this region, the damping sleeve 32 includes a collar 51 which extends radially inwardly as shown. The collar 51 is an elastic intermediate insert in the longitudinal direction between the clamp 7 and the guide tube 2, on the one hand, and the longitudinal stop 50 on the other hand. The damping sleeve 32 and the clamp 7 are configured as separate individual parts.

In another advantageous embodiment, the damping sleeve 32 is vulcanized to the clamping sleeve 10 of the clamp 7. The cutout 14 in the housing 5 is open at the longitudinal end and accommodates the clamping lugs 12 as well as a lug 34 of the damping sleeve 32.

Figure 4:
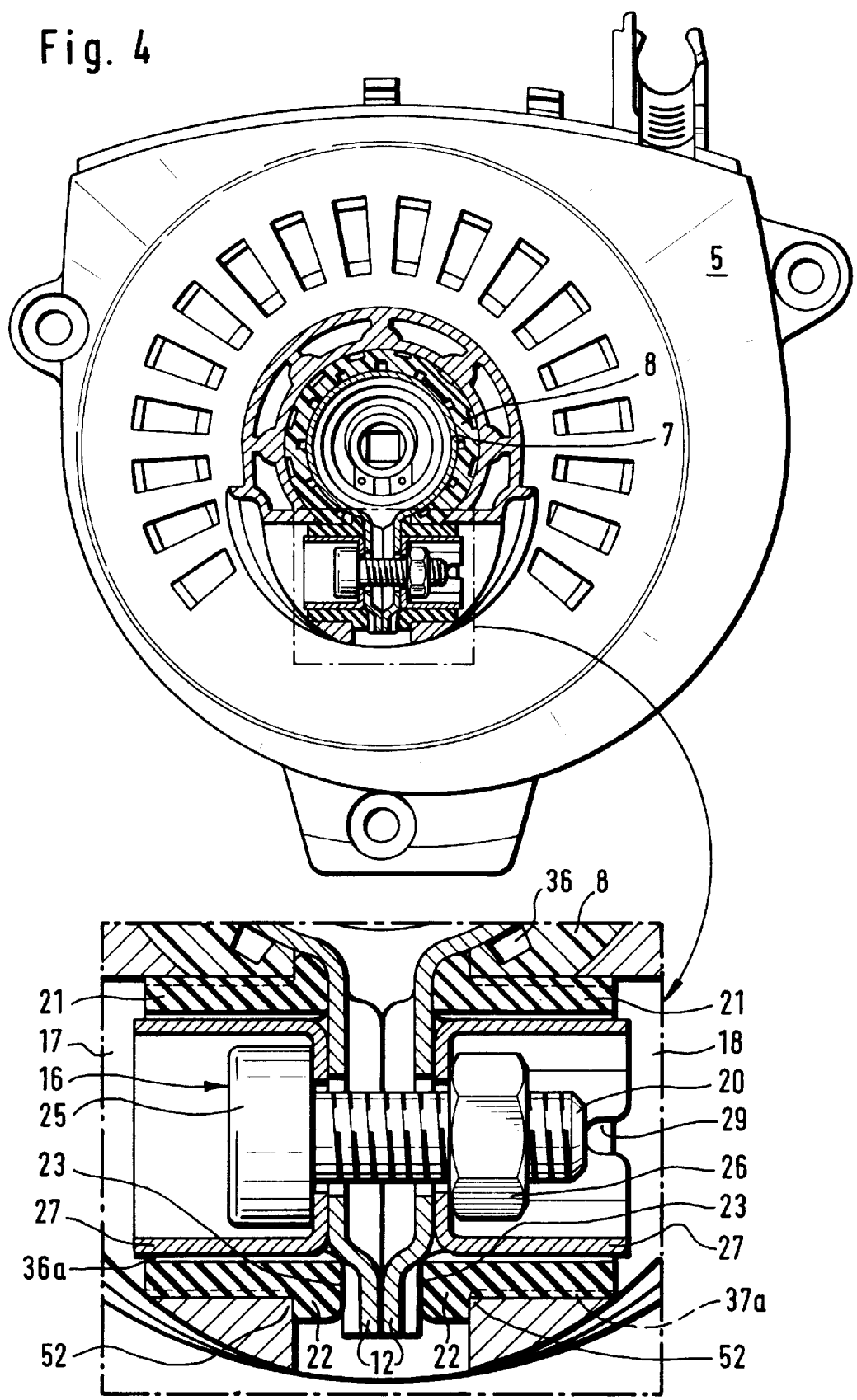
FIG. 4 is a section view taken along line IV—IV of FIG. 3.

FIG. 4 shows a cross-sectional view of the arrangement of FIG. 3 along line IV—IV. The clamp 7 is fixed form tight in the housing 5 in that the two clamping lugs 12 are held in the cutout 14 (FIG. 3) and the two ends (19, 20) of the clamping bolt 16 are held in respective openings (17, 18) in housing 5. Thus, the clamp 7 and the housing 5 are conjointly configured for fixing the clamp 7 form closed in the housing 5 so as to interlock the clamp 7 and the housing 5 to prevent a rotation of the clamp 7 and the housing 5 relative to each other. The two sleeves (27a, 27b) are surrounded by damping bushings (21a, 21b), respectively. The damping bushings (21a, 21b) can also be vulcanized to the sleeves (27a, 27b), respectively. The damping bushings (21a, 21b) are form-tightly fixed in housing 5 in that the respective collars 22 thereof engage behind an edge 52. The two clamping lugs 12 lie in surface contact engagement against the respective end faces 23 in the region of the collar 22 of the damping bushings 21.

Figure 5:
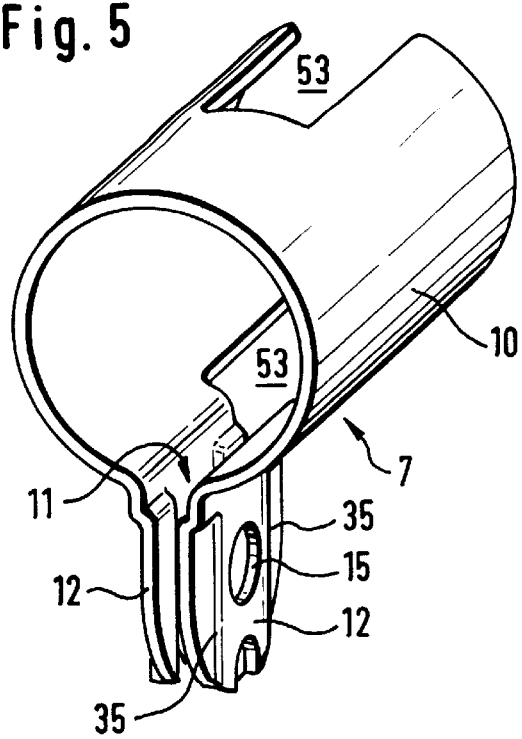
FIG. 5 is a perspective view of the clamp as an individual part.

FIG. 5 shows a perspective view of the details of the clamp 7 in accordance with the description provided above. The two clamping lugs 12 include reinforcing creases 35 on both sides of the bores 15. The longitudinal slit 11 extends between the two damping lugs 12 in the longitudinal direction and is expanded to define a notch 53 at the end (FIG. 5) facing toward the clutch drum 47. A further notch 53 is provided in the clamping sleeve 10 in a location lying opposite in the radial direction. It can be practical to provide more than two notches 53 via which the clamping sleeve 10 is subdivided into a corresponding number of segments. The clamp 7 is configured as one piece from sheet metal.

Figure 6:
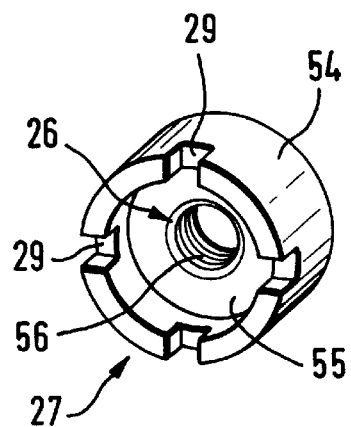
FIG. 6 is a perspective view of a sleeve for accommodating the clamping bolt.

FIG. 6 shows a perspective view of a variation of the sleeve 27 of FIG. 2 which is configured as one piece with the nut 26. For this purpose, a threaded bore 56 is provided in the base 55 surrounded by a peripheral part 54. Holding slits 29 for a screwdriver or the like are arranged on the end of the peripheral part 54 facing away from the base 55.

Figure 7:
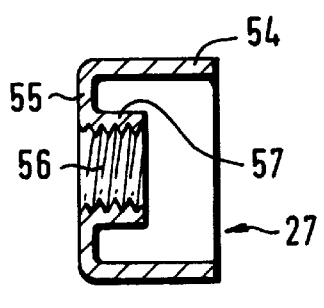
FIG. 7 shows a variation of the sleeve of FIG. 6 made of pressed sheet metal and shown in cross section.
Figure 8:
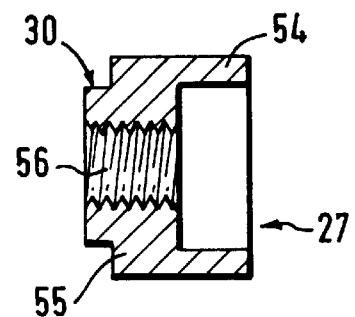
FIG. 8 is a further variation of the sleeves of FIGS. 6 and 7 provided with a fix against rotation and shown in cross section.
Figure 9:
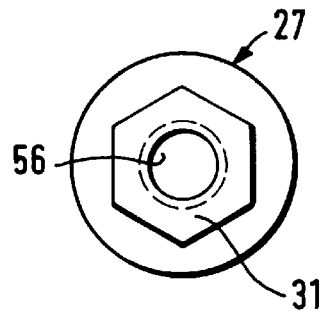
FIG. 9 is an end view of the sleeve of FIG. 8.

A further variation of the sleeve 27 is shown in FIG. 7 and is here made of a steel stamped part with a peripheral part 54 and a base 55. In the base 55, a flange 57 with a winding is provided which defines the threaded bore 56. A further variation of the sleeve 27 is presented in FIGS. 8 and 9 wherein an ensurance or fix 30 against rotation is provided in the form of a hexagon 31 formed on the end face 55 in the region of the threaded bore 56.

Figure 10:
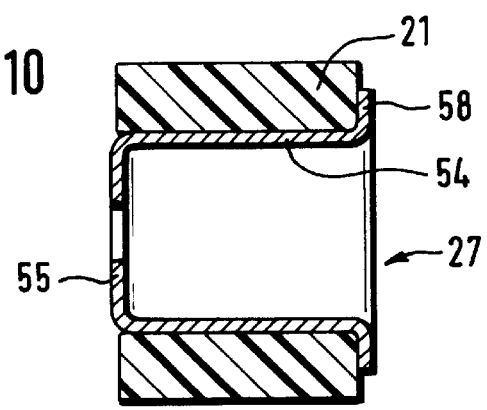
FIG. 10 shows a cross-sectional view of a sleeve having a collar and with a damping bushing pushed thereon.

FIG. 10 shows another variation of the sleeve 27 wherein the peripheral part 54 is flanged over to form a collar 58 at the end thereof lying opposite the base 55. In this variation, the damping bushing 21 is configured as a tube-like extrusion part and is mounted preassembled on the sleeve 27 at the collar 58. The collar 58 prevents a slippage of the damping bushing 21 during assembly by pressing and provides ensurance against loss for the damping bushing 21 in the assembled state.

It is understood that the foregoing description is that of the preferred embodiments of the invention and that various changes and modifications may be made thereto without departing from the spirit and scope of the invention as defined in the appended claims.

What is claimed is:

1. A portable handheld work apparatus comprising:
a housing;
a guide tube having first and second ends;
a drive shaft rotatably journalled in said guide tube;
a rotatable work tool mounted at said second end of said guide tube;
a drive motor mounted in said housing for rotatably driving said work tool via said drive shaft;
an anti-vibration unit for holding said guide tube in said housing at said first end of said guide tube;
said anti-vibration unit including a clamp surrounding said guide tube;
an elastic damping element disposed between said housing and said clamp;
said clamp and said housing being configured for fixing said clamp form tight in said housing;
said clamp being configured as an approximately cylindrical clamping sleeve defining a longitudinal slit and having two clamping lugs arranged laterally of said longitudinal slit;
said clamping lugs extending radially outwardly and being clampable against one another;
said housing having an end portion directed toward said guide tube; and,
said end portion having a cutout for accommodating said clamping lugs therein.

2. The portable handheld work apparatus of claim 1, said cutout being open at said end portion of said housing.

3. The portable handheld work apparatus of claim 1, said anti-vibration unit including a clamping bolt and said clamping lugs having respective bores for accommodating said clamping bolt therein; and, said housing having at least one opening formed in said housing approximately coaxial to said bores for accommodating one end of said clamping bolt therein.

4. The portable handheld work apparatus of claim 1, said anti-vibration unit including a clamping bolt and said lugs having respective bores for accommodating said clamping bolt therein; and, said housing having two openings formed in said housing approximately coaxial to said bores for introducing and accommodating said clamping bolt.

5. The portable handheld work apparatus of claim 4, said anti-vibration unit further including an elastic damping element disposed in each of said two openings of said housing; and, said elastic damping elements being in the form of a damping bushing surrounding an end of said clamping bolt.

6. The portable handheld work apparatus of claim 5, said damping bushing having a peripherally extending collar fixing said damping bushing form tight in said housing.

7. The portable handheld work apparatus of claim 6, each of said clamping lugs being in surface contact engagement with an end face of the peripherally extending collar of the corresponding damping bushing.

8. The portable handheld work apparatus of claim 7, wherein said clamping bolt is a threaded bolt having a head and a nut; and, said anti-vibration unit further including first and second sleeves disposed in said elastic damping bushings, respectively, for accommodating corresponding ones of said head and said nut.

9. The portable handheld work apparatus of claim 8, said second sleeve accommodating said nut and having mutually opposite lying flats approximately parallel to each other for holding said nut so that said nut cannot rotate relative thereto.

10. The portable handheld work apparatus of claim 9, wherein said nut and said second sleeve are configured as one piece.

11. The portable handheld work apparatus of claim 8, wherein said first and second sleeves are made of steel.

12. The portable handheld work apparatus of claim 8, wherein said second sleeve has an end face having a holding slot formed therein; and, said second sleeve defining a hexagonal formed therein to trap said nut and prevent rotation thereof relative to said second sleeve.

13. The portable handheld work apparatus of claim 5, said anti-vibration unit further including an elastic damping sleeve surrounding said clamping sleeve; said elastic damping sleeve having a cutout formed therein surrounding said clamping lugs; and, said elastic damping sleeve having a radially outwardly extending lug projecting into said cutout of said end portion of said housing.

14. The portable handheld work apparatus of claim 13, wherein said damping bushings and said elastic damping sleeve have an adapted stiffness.

15. The portable handheld work apparatus of claim 13, wherein said damping bushings and said elastic damping sleeve are made of rubber having an adapted Shore hardness.

16. The portable handheld work apparatus of claim 5, wherein each of said damping bushings has inner and outer surfaces; said damping bushings having longitudinal slots formed in at least one of said inner and outer surfaces thereof.

17. The portable handheld work apparatus of claim 16, wherein each of said damping bushings has a first set of said longitudinal slots formed in said inner surface and a second set of said longitudinal slots formed in said outer surface; and, said first set of longitudinal slots are offset with respect to said second set of longitudinal slots.

18. The portable handheld work apparatus of claim 1, wherein said end portion of said housing has an end face; and, said longitudinal slit is extended beyond the region of said clamping lugs in a direction away from the end face of said end portion.

19. The portable handheld work apparatus of claim 18, wherein said longitudinal slit extends over the entire length of said clamping sleeve.

20. The portable handheld work apparatus of claim 1, wherein said clamping sleeve with said clamping lugs is made of sheet metal and formed as a single piece.

21. The portable handheld work apparatus of claim 1, wherein said clamping lugs have reinforcing creases formed therein.

22. A portable handheld work apparatus comprising:
a housing;
a guide tube having first and second ends;
drive shaft rotatably journalled in said guide tube;
a rotatable work tool mounted at said second end of said guide tube;
a drive motor mounted in said housing for rotatably driving said work tool via said drive shaft;
an anti-vibration unit for holding said guide tube in said housing at said first end of said guide tube;
said anti-vibration unit including a clamp surrounding said guide tube;
an elastic damping element disposed between said housing and said clamp; and,
said clamp and said housing being conjointly configured for fixing said clamp form closed in said housing so as to interlock said clamp and said housing to prevent a rotation of said clamp and said housing relative to each other.

* * * * *